United States Patent [19]

Feess et al.

[11] 4,201,547
[45] May 6, 1980

[54] PROCESS FOR THE PREPARATION OF AZO DYESTUFFS ON FIBER MATERIALS CONSISTING OF, OR CONTAINING, CELLULOSE FIBERS

[75] Inventors: Erich Feess, Hofheim am Taunus; Hartmut Springer, Königstein; Paul Karácsonyi, Frankfurt am Main; Willy Gronen, Schöllkrippen; Horst Curtius, Kelkheim, all of Fed. Rep. of Germany

[73] Assignee: Hoechst Aktiengesellschaft, Frankfurt am Main, Fed. Rep. of Germany

[21] Appl. No.: 888,030

[22] Filed: Mar. 20, 1978

[30] Foreign Application Priority Data

Mar. 22, 1977 [DE] Fed. Rep. of Germany ....... 2712367

[51] Int. Cl.² ............................................. D06P 1/12
[52] U.S. Cl. .......................................... 8/543; 8/661
[58] Field of Search ................... 8/1 XA, 44, 46, 51, 8/42 R, 54.2

[56] References Cited

U.S. PATENT DOCUMENTS

| 2,349,089 | 5/1944 | Haddock | 8/42 |
| 2,349,090 | 5/1944 | Haddock | 8/42 |
| 2,351,119 | 6/1944 | Haddock | 8/46 |
| 2,363,905 | 11/1944 | Libby et al. | 8/42 |
| 2,363,906 | 11/1944 | Rossander et al. | 8/42 |
| 4,057,389 | 11/1977 | Feess et al. | 8/46 |
| 4,094,647 | 6/1978 | Feess et al. | 8/46 |

FOREIGN PATENT DOCUMENTS

| 1289206 | 2/1969 | Fed. Rep. of Germany . |
| 603753 | 6/1948 | United Kingdom . |
| 1112875 | 5/1968 | United Kingdom . |

Primary Examiner—A. Lionel Clingman
Attorney, Agent, or Firm—Curtis, Morris & Safford

[57] ABSTRACT

Azo developing dyestuffs are produced by diazotizing on the fiber a mono- to tetramine derived from a metal-containing or metal-free phthalocyanine, the amino group(s) being bound to a phenyl or naphthyl group (which may be substituted) which is linked via a bridge member to the phthalocyanine which may further contain up to 3 optionally substituted sulfon amide groups and up to 3 sulfo groups, and coupling said diazotized amino onto azoic coupling components usual for preparing developing dyestuffs.

15 Claims, No Drawings

PROCESS FOR THE PREPARATION OF AZO DYESTUFFS ON FIBER MATERIALS CONSISTING OF, OR CONTAINING, CELLULOSE FIBERS

The present invention relates to a process for the preparation of green to black developing dyestuffs and their mixtures, more specifically to a process for preparing developing dyestuffs on fiber materials consisting of, or containing, cellulose fibers, which comprises diazotizing on the fiber an amine of the formula I

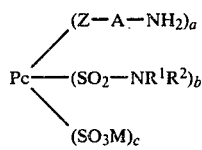

wherein
Pc is metal-containing or metal-free phthalocyanine,
Z is a bridge member,
A is phenylene or naphthylene which is unsubstituted or substituted by halogen, lower alkyl, lower hydroxyalkyl, lower chloroalkyl, lower alkoxy, phenoxy, carbamoyl, N-(lower alkyl)-carbamoyl, N,N-di-(lower alkyl)-carbamoyl, sulfamoyl, N-(lower alkyl)-sulfamoyl, N,N-di-(lower alkyl)-sulfamoyl, lower carboalkoxy, lower alkylsulfonyl, phenyl sulfonyl, trifluoromethyl, nitro, lower alkanoylamino, benzoylamino, sulfo, carboxy, cyano or a group of the formula II $$R^3-SO_2-NR^4- \qquad (II)$$

in which
$R^3$ is lower alkyl, phenyl or tolyl and $R^4$ is hydrogen or lower alkyl,
with the proviso that the diazotizable amino group must not be linked in ortho-position to a carboxylic or sulfonic amide group containing at least one hydrogen atom on the amide nitrogen,
$R^1$ and $R^2$, which are the same or different, are hydrogen, lower alkyl, lower hydroxyalkyl, (lower alkoxy)-lower alkyl, phenyl or naphthyl, which aromatic groups are unsubstituted or substituted by methyl, methoxy, carboxy or lower alkyl sulfonyl or $R^1$ and $R^2$ together with the nitrogen to which they are linked mean piperidyl or morpholyl,
M is a cation,
a is a number from 1 to 4,
b and c are numbers from zero to 3, with the proviso that the sum of a and b and c is at most 4,
and coupling said diazotized amine with an azoic coupling component capable of producing a developing dyestuff.

It is already known from French Pat. No. 935,460 to prepare developing dyes on the fiber by diazotizing first an amine of the formula I, in which Z stands for a carbonyl, sulfonyl or mercapto group and A represents a phenyl radical optionally substituted by methyl, then applying the diazonium compound onto the fiber and coupling the same there with common coupling components. Apart from the fact that the decomposable diazonium salts have to be prepared in this case in a separate operational step, this known process has the drawback that these diazonium salts have a relatively low solubility (about 2.5 parts by weight for 1000 parts of solution) and thus lead only to a low color depth. This is why this process has not been of any importance in practice. In contradistinction thereto, according to the process of the invention the amines are applied onto the fibrous material in the form of fine dispersions or preferably as alkaline solutions, by which measure it is possible to apply considerably higher concentrations of amine and thus to obtain considerably higher color depths.

Preference is given in particular to amines of the formula I, in which Z stands for a group of the formula III $$-SO_2-NR^4-B- \qquad (III).$$

In this formula $R^4$ is defined as above and represents preferably hydrogen; B represents a direct bond or one of the following bridge members

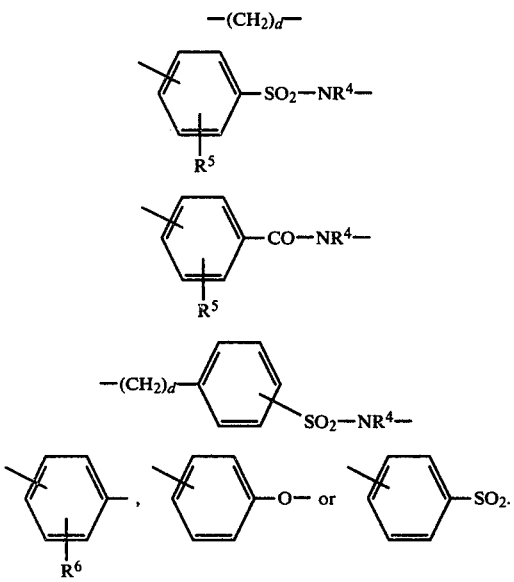

In these formulae
d represents a number of from 1 to 5,
$R^5$ represents lower alkyl, lower alkoxy or halogen, and
$R^6$ represents methyl, methoxy or chlorine.

Amines of this kind are known, for example, from German Pat. No. 1,289,206.

The aliphatic radicals termed "lower" contain up to 6, preferably up to 4 carbon atoms.

The amines of the formula I which carry sulfamoyl groups containing hydrogen atoms on the amide nitrogen are soluble in aqueous alkali. Besides, there may also be present other water-solubilizing groups, such as carboxy and sulfo groups, whose number should not exceeed a total of 3, however, since otherwise the phthalocyanine-azo dyestuff produced on the fiber is insufficiently fixed due to its excessive solubility and/or shows an insufficient fastness to wetting.

Especially preferred are amines of the formula

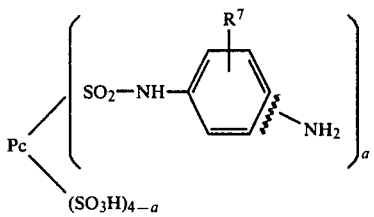

wherein Pc is nickel-phthalocyanine, $R^7$ is hydrogen, chlorine or methyl and a is 1.5 to 2.9.

If there is bound to the radical A a carbamoyl or sulfamoyl group with an amide nitrogen atom which also contains a hydrogen atom, the diazotizable amino group must not be bound in the o-position, since otherwise the diazonium compound is no longer capable of coupling onto the coupling component, but rather forms a triazole ring with the amide nitrogen atom.

Among the phthalocyanine radicals, preference is given to those which contain metal, in particular copper and especially nickel.

Suitable coupling components for the process of the invention are above all, arylamides of aceto-acetic acid, of 2-hydroxy-naphthalene-3-carboxylic acid or of heterocyclic o-hydroxy-carboxylic acids. Examples are 5-chloro-2-aceto-acetylamino-1,4-dimethoxybenzene (C.I. No. 37 613), 4,4'-bis-(aceto-acetyl-amino)-3,3'-dimethyldiphenyl (C.I. No. 37 610), 2-acetoacetylamino-6-ethoxy-benzothiazole (C.I. No. 37 625), α,α'-terephthaloyl-bis-(4-chloro-5-methyl-o-acetoanisidide (C.I. No. 37 620) and α,α'-terephthaloyl-bis-(5-chloro-2,4-dimethoxyacetanilide) (C.I. No. 37 615) and, furthermore, 2-hydroxy-naphthalene-3-carboxylic acid-phenylamide (C.I. No. 37 505) and the derivatives thereof which are substituted in the phenylamide radical by lower alkyl, lower alkoxy or chlorine, such as 2-hydroxy-naphthalene-3-carboxylic acid-(2'-methyl-phenyl-1')-amide (C.I. No. 37 520), 2-hydroxynaphthalene-3-carboxylic acid-(2'-methoxy-phenyl-1')-amide (C.I. No. 37 530), 2-hydroxy-naphthalene-3-carboxylic acid-(3'-chloro-6'-methoxy-phenyl-1')-amide (C.I. No. 37 531), as well as 2-hydroxy-carbazole-3-carboxylic acid-(4'-chloro-phenyl-1')-amide (C.I. No. 37 600).

The application of the dyestuff components and the production of the dyestuff on the fiber may be effected according to all known methods for the preparation of developing dyes. Preference is given to those methods in which the amine of the formula I, one or several coupling components, the nitrous acid derivative required for the diazotization of the amine, alkali and optionally a printing thickener are applied onto the fiber material in a single operation. The dyestuff formation is then effected in known manner by an acidic treatment at normal or elevated temperature and optionally by a subsequent alkali passage (U.S. Pat. Nos. 4,057,389 and 4,094,637).

Thus, for example, it is possible to pad and/or print an aqueous padding liquor or printing paste which contains an alkaline solution of the amine of the formula I and/or a fine dispersion of an amine of the formula I, one or several coupling components, sodium nitrite and the printing thickener, onto the fiber material and to subject the goods thus treated directly, or after an intermediate drying, to the acidic treatment.

The dyestuff formation by the action of acid may be effected, for example, by acidic steaming, in which process the goods are passed for about 5 to 60 seconds through acidic steam, formic acid and/or acetic acid being preferable. It is also possible, however, to spray, pad or slop-pad the dried dyeings and/or prints with aqueous solutions of organic acids and/or to apply the acid in the form of a foam onto the goods, and to complete the development optionally by a subsequent passage in neutral steam for about 5 to 60 seconds. As acids there may be used in this case, too, slightly volatile acids, such as formic acid or organic acids having a boiling point of more than 175° C. at normal pressure, a minimum solubility in water of 30 g in 100 g of water, a $p_K$ value of from 4 to 2.5 at 20° C., for example glycolic acid or monochloroacetic acid. It is an essential precondition in each case that the low pH value which is required for the diazotization is reached, without leaving the medium too acidic for coupling on the other hand. Formic acid is very advantageous because it is oxidized to give carbon dioxide by excess nitrous gases released when setting free the nitrous acid thereby reducing the amount of nitrous gases set free, and on the other hand contributes by evaporation during a neutral steam passage to the desired increase of the pH value.

By way of the process of the invention and with the aid of common coupling components, fast and deep green shades are obtained on the fiber, which has not been possible so far according to the conventional methods of preparing developing dyes.

The following Examples serve to illustrate the invention. All percentages are by weight.

EXAMPLE 1:

A cotton fabric is printed with a printing paste having the following composition:

150 g of a 20% aqueous-alkaline solution of the compound of the formula

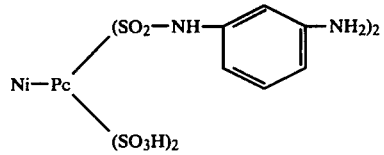

are mixed with 30 g of a 30% aqueous-alkaline solution of bisacetoacetic acid-o-toluidide. To this solution are added 10 g of 32.5% sodium hydroxide solution and 30 g of diethylene-glycol-mono-n-butylether.

This solution is introduced while stirring into 500 g of a 5% aqueous solution of a commercial alkalistable carob bean flour ether as thickener. Finally, 7 g of sodium nitrite are also added to the printing paste, and the composition is made up to 1000 g with water and/or the said thickening agent.

After drying, the printed goods are padded on a padding mangle with a 5% aqueous formic acid solution (liquor pick-up 100%) and are immediately thereafter steamed for 5 seconds in saturated steam having a temperature of from 105° to 110° C.

Subsequently the printed goods are rinsed in cold water and washed in a soap bath of 90° C. for 10 minutes, then rinsed again and dried.

A bright deep green print is obtained, which shows a very good fastness to light and good general fastness properties.

EXAMPLE 2:

The process as described in Example 1 is repeated with the following alterations:
Instead of
30 g of the 30% aqueous-alkaline solution of bisacetoacetic acid-o-toluidide there are used
20 g of a 30% aqueous-alkaline solution of 2,5-dimethoxy-4-chloro-aceto-acetic acid anilide, and
30 g of thiodiethylene-glycol are added instead of the
30 g of diethylene-glycol-mono-n-butylether.

The development of the dyestuff is effected in 5% aqueous monochloroacetic acid instead of 5% aqueous formic acid.

By way of this process, too, a clear deep green print is obtained which shows good fastness properties.

EXAMPLE 3:

A cotton fabric is printed with a printing paste having the following composition:
150 g of a 20% aqueous-alkaline solution of the compound of the formula

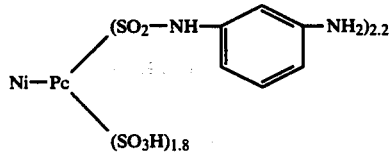

are mixed with
20 g of a 30% aqueous-alkaline solution of 2-hydroxy-3-naphthoic acid-o-methoxy-anilide. The other components of the printing paste and the further processing of the print correspond to the specifications given in Example 1.

A black shade is obtained, which shows a very good fastness to light and good general fastness properties.

EXAMPLE 4:

A cotton knitted fabric is slop-padded with a thickened solution having the following composition:
150 g of a 20% aqueous-alkaline solution of the compound of the formula

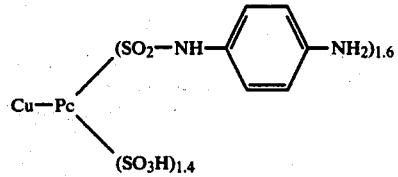

are mixed with
30 g of a 30% aqueous-alkaline solution of bis-acetoacetic acid-o-toluidide. To this solution are added
10 g of 32.5% sodium hydroxide solution and
30 g of diethylene-glycol-mono-butylether.
Furthermore, there are introduced, while stirring,
100 g of the 5% aqueous solution of an alkali-stable carob bean flour ether and
7 g of sodium nitrite.
The solution is then filled up with water to 1 liter.
The slop-padded goods are padded after drying with a 5% aqueous formic acid solution and are immediately thereafter steamed for 5 seconds at a temperature in the range of from 105° to 110° C., rinsed, soaped and dried.

A clear deep green dyeing is obtained which shows good fastness properties.

EXAMPLE 5:

A cotton fabric is printed with a printing paste having the following composition:
150 g of a 20% aqueous-alkaline solution of the compound of the formula

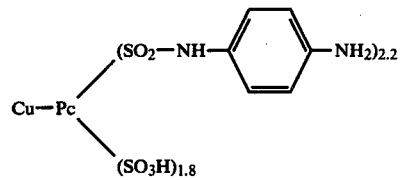

are mixed with
20 g of a 30% aqueous-alkaline solution of 2,5-dimethoxy-4-chloro-aceto-acetic acid anilide. To the solution are added
10 g of 32.5% sodium hydroxide solution and
30 g of thiodiethylene-glycol. The solution is then introduced, while stirring, into
500 g of a 5% aqueous solution of an alkali-stable carob bean flour ether as thickening agent. Afterwards
7 g of sodium nitrite are added to the printing paste which is then made up with water and/or thickening agent to
1000 g.

The printed goods are padded after drying with a 5% aqueous solution of monochloroacetic acid and are then steamed for 5 seconds in saturated steam of a temperature of from 105° to 110° C., thereafter rinsed, soaped and dried.

As a result, a bright deep green print is obtained which shows good fastness properties.

EXAMPLE 6:

A cotton fabric is printed with a printing paste having the following composition:
150 g of a 20% aqueous-alkaline solution of the compound of the formula

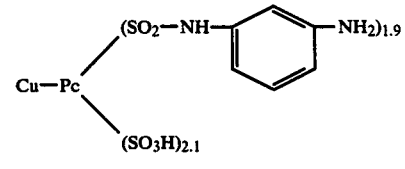

are mixed with
25 g of a 25% aqueous-alkaline solution of 2-hydroxy-3-naphthoic acid-o-methoxy-anilide. To this solution are added
10 g of 32.5% sodium hydroxide solution,
20 g of thiodiethylene-glycol,
500 g of a 6% aqueous solution of an alkali-stable guar derivative as thickener, and
20 g of a 30% aqueous solution of sodium nitrite.
The mixture is made up to
1000 g with water and/or thickening agent.

After drying, the printed goods are slop-padded by means of a blotch roller with a thickened 5% aqueous solution of a mixture of 50% of glycolic acid and 50% of lactic acid and are subsequently steamed for 10 seconds in saturated steam of a temperature of from 104° to 106° C.

After rinsing, washing and drying, a deep black print results which has good fastness properties.

EXAMPLE 7:

A fabric of highly water-resistant regenerated cellulosic ("polynosic") fibers is printed with a printing paste having the following composition:

120 g of the 20% aqueous-alkaline solution of the compound of the formula

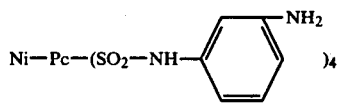

are combined with 25 g of a 30% aqueous-alkaline solution of bis-acetoacetic acid-o-toluidide. To this solution are added
8 g of 32.5% sodium hydroxide solution,
25 g of diethylene-glycol-mono-n-butylether,
500 g of a 5% aqueous solution of an alkali-stable carob bean flour ether as thickener, and
20 g of a 30% aqueous sodium nitrite solution. The mixture is then made up with water and/or thickening agent to
1000 g.

The printed goods are padded after drying on a padding mangle using a 5% aqueous monochloroacetic acid solution and are then exposed to an air passage for 1 to 2 minutes. Thereafter they are rinsed, washed and dried.

As a result, a bright green print is obtained which shows good fastness properties.

EXAMPLES 8 to 18:

Printing pastes are prepared each of which contains 150 g of the 20% aqueous-alkaline solution of compounds having the following formula:

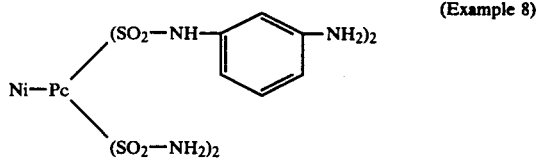
(Example 8)

or of the general formula

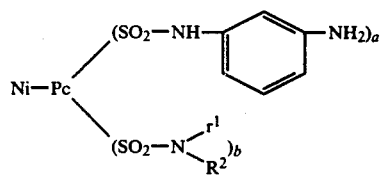

in which the indices have the following meanings:

| Example | a | b | R¹ | R² |
|---|---|---|---|---|
| 9 | 2 | 2 | —CH₃ | H |
| 10 | 2 | 2 | —C₆H₅ (phenyl) | H |
| 11 | 3 | 1 | —C₂H₅ | —C₂H₅ |
| 12 | 1 | 3 | —C₂H₄OH | H |
| 13 | 3 | 1 | —CH₃ | —C₃H₆OCH₃ |
| 14 | 2 | 2 | —C₆H₄—SO₂CH₃ | H |
| 15 | 2 | 2 | —C₆H₄—OCH₃ | H |
| 16 | 2 | 2 | —C₆H₄—SO₃H | H |
| 17 | 2 | 2 | —C₆H₄—COOH | H |
| 18 | 2 | 2 | —naphthyl—SO₃H | H |

The printing pastes further contain
30 g of a 30% aqueous-alkaline solution of bis-acetoacetic acid-o-toluidide,
10 g of 32.5% sodium hydroxide solution,
30 g of diethylene-glycol-mono-n-butylether,
500 g of a 5% aqueous solution of an alkali-stable carob bean flour ether as thickener, and
20 g of a 30% aqueous sodium nitrite solution.

The remainder of
1000 g consists of water and/or thickening agent.

With the printing pastes obtained a cotton fabric is printed, which is subsequently dried, padded with a 5% aqueous formic acid solution and steamed for 5 seconds in saturated steam of a temperature of from 105° to 110° C.

After rinsing, soaping and drying, bright deep green prints are obtained which show good fastness properties.

Analogous results are obtained, if use is made of the following amines of the formula IV

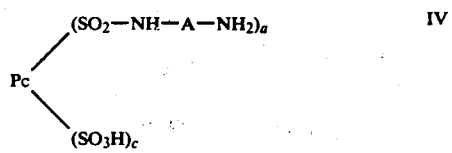  IV

| Example No. | Pc | A | a | c |
|---|---|---|---|---|
| 19 | NiPc | 2,4-dimethylphenyl (CH3) | 3 | 0 |
| 20 | NiPc | 2,4-dimethylphenyl (H3C-) | 2 | 1 |
| 21 | NiPc | 4-methoxyphenyl (H3CO-) | 2 | 2 |
| 22 | NiPc | 4-ethoxyphenyl (H5C2O-) | 2 | 2 |
| 23 | NiPc | 4-chlorophenyl (Cl-) | 2 | 2 |
| 24 | NiPc | 2-chlorophenyl (-Cl) | 4 | 0 |
| 25 | NiPc | 2-nitrophenyl (NO2) | 2 | 2 |
| 26 | NiPc | 4-chloro-2-methoxyphenyl (Cl-, OCH3) | 2 | 2 |
| 27 | NiPc | methylphenyl (H3C-) | 2.5 | 1.5 |
| 28 | CuPc | phenyl | 2.7 | 1.3 |
| 29 | NiPc | methylphenyl (CH3) | 2.8 | 1.2 |
| 30 | CuPc | methylphenyl (CH3) | 3.5 | 0.5 |
| 31 | NiPc | methoxyphenyl (CH3O-) | 1.4 | 2.6 |
| 32 | NiPc | ethoxyphenyl (H5C2O-) | 1.7 | 2.3 |
| 33 | CuPc | ethoxyphenyl (H5C2O-) | 2.3 | 1.7 |
| 34 | NiPc | chlorophenyl (Cl) | 2.9 | 1.1 |
| 35 | CuPc | chlorophenyl (Cl) | 2.4 | 1.6 |
| 36 | NiPc | chlorophenyl (Cl) | 4 | 0 |
| 37 | NiPc | chloro-methylphenyl (Cl, CH3) | 2 | 2 |
| 38 | CuPc | chloro-methylphenyl (Cl, CH3) | 2 | 2 |
| 39 | NiPc | chloro-trifluoromethylphenyl (Cl, CF3) | 2 | 2 |
| 40 | NiPc | carboxyphenyl (COOH) | 2 | 2 |
| 41 | NiPc | carbamoylphenyl (CONH2) | 2 | 2 |
| 42 | NiPc | methoxycarbonylphenyl (COOCH3) | 2 | 2 |
| 43 | CuPc | sulfophenyl (SO3H) | 2 | 2 |
| 44 | CuPc | methyl-sulfophenyl (CH3, SO3H) | 2 | 2 |
| 45 | CuPc | methyl-sulfamoylphenyl (CH3, SO2NH2) | 2 | 2 |
| 46 | CuPc | methyl-N-methylsulfamoylphenyl (CH3, SO2NH—CH3) | 2 | 2 |

-continued

| Example No. | Pc | A | a | c |
|---|---|---|---|---|
| 47 | CuPc | 2,5-dimethyl-phenyl-SO₂N(C₂H₅)₂ (with CH₃) | 2 | 2 |
| 48 | CuPc | 2,5-dimethyl-phenyl-SO₂CH₃ (with CH₃) | 2 | 2 |
| 49 | CuPc | 3,4,5-trimethyl-phenyl-SO₂—C₂H₅ | 2 | 2 |
| 50 | CuPc | 3,4,5-trimethyl-phenyl-SO₂-phenyl | 2 | 2 |
| 51 | NiPc | 2,4-dimethylphenyl-O-phenyl | 2 | 2 |
| 52 | NiPc | 3,4,5-trimethyl-phenyl-NH—COCH₃ | 2 | 2 |
| 53 | NiPc | 3,4,5-trimethyl-phenyl-NH—SO₂CH₃ | 2 | 2 |
| 54 | CuPc | 3,4,5-trimethyl-phenyl-NH—SO₂-p-tolyl | 2 | 2 |
| 55 | CuPc | 2,4-dimethylphenyl-N(CH₃)—COCH₃ | 2 | 2 |

-continued

| Example No. | Pc | A | a | c |
|---|---|---|---|---|
| 56 | CuPc | 2,4-dimethylphenyl-N(CH₃)—SO₂-p-tolyl | 2 | 2 |
| 57 | NiPc | p-phenylene | 4 | 0 |
| 58 | NiPc | p-phenylene | 3 | 0 |
| 58a | NiPc | p-phenylene | 1.7 | 2.3 |
| 59 | CuPc | p-phenylene | 4 | 0 |
| 60 | CuPc | p-phenylene | 3 | 0 |
| 61 | NiPc | m-phenylene | 3 | 0 |
| 62 | NiPc | 2-methyl-1,4-phenylene (H₂C—) | 1.5 | 2.5 |
| 63 | CuPc | 2-methyl-1,4-phenylene (H₂C—) | 1.5 | 2.5 |
| 64 | NiPc | 2-methyl-1,4-phenylene (CH₃) | 2.6 | 1.4 |
| 65 | CuPc | 2-methyl-1,4-phenylene (CH₃) | 2.3 | 1.7 |
| 66 | NiPc | 2-methoxy-1,4-phenylene (OCH₃) | 2.4 | 1.6 |
| 67 | CuPc | 2-methoxy-1,4-phenylene (OCH₃) | 1.5 | 2.5 |

-continued

| Example No. | Pc | A | a | c |
|---|---|---|---|---|
| 68 | NiPc | (2-Cl phenyl) | 4 | 0 |
| 69 | NiPc | (2,4-diCl phenyl) | 1.7 | 2.3 |
| 70 | NiPc | (4-Cl-2,5-diCH₃ phenyl) | 1.5 | 2.5 |
| 71 | CuPc | (4-Cl-2,5-diCH₃ phenyl) | 1.5 | 2.5 |
| 72 | CuPc | (2-COOH phenyl) | 2 | 2 |
| 73 | NiPc | (2-CF₃ phenyl) | 2 | 2 |
| 74 | NiPc | (2-CN phenyl) | 2 | 2 |
| 75 | CuPc | (2-CN phenyl) | 2 | 2 |
| 76 | NiPc | (2-SO₃H phenyl) | 2 | 1 |
| 77 | CuPc | (2-SO₃H phenyl) | 2 | 2 | and/or of the amines of the formula V $$Pc\begin{cases}(SO_2-NH-B-A-NH_2)_a\\(SO_3H)_c\end{cases} \quad V$$

| Example No. | Pc | B | A | a | c |
|---|---|---|---|---|---|
| 78 | CuPc | —CH₂—CH₂— | (1,4-phenylene) | 2 | 2 |
| 79 | CuPc | (4-SO₂—NH— phenyl) | (1,3-phenylene) | 3 | 1 |
| 80 | CuPc | (3-SO₂—NH— phenyl) | (1,4-phenylene) | 2 | 2 |
| 81 | CuPc | (2-CH₃-5-SO₂—NH— phenyl) | (1,4-phenylene) | 2 | 2 |
| 82 | CuPc | (5-CH₃O-2-CH₃-SO₂—NH— phenyl) | (1,4-phenylene) | 2 | 2 |
| 83 | CuPc | (4-Cl-3-CH₃-SO₂—NH— phenyl) | (1,4-phenylene) | 2 | 2 |
| 84 | NiPc | (4-CO—NH— phenyl) | (1,3-phenylene) | 2 | 2 |

-continued

| Example No. | Pc | B | A | a | c |
|---|---|---|---|---|---|
| 85 | NiPc | ![m-tolyl-CO-NH-] | ![m-phenylene] | 2 | 2 |
| 86 | NiPc | —(CH₂)₂—⟨phenyl⟩—SO₂—NH— | ![m-phenylene] | 3 | 0 |
| 87 | NiPc | H₃C-⟨phenyl⟩- | CH₃-⟨phenyl⟩- | 2 | 2 |
| 88 | NiPc | ⟨phenyl⟩—O— | ⟨phenyl⟩ | 2 | 2 |
| 89 | NiPc | ⟨phenyl⟩—SO₂— | ⟨phenyl⟩ | 2 | 2 |

EXAMPLE 90

Cotton fabric is padded with a liquor having the following composition:

150 g of a 20% aqueous-alkaline solution of the compound of the formula

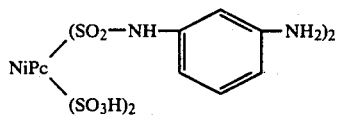

$$NiPc\begin{matrix}(SO_2-NH-\bigcirc-NH_2)_2\\(SO_3H)_2\end{matrix}$$

are mixed with 35 g of a 30% aqueous-alkaline solution of bis-acetoacetic acid-o-toluidide; thereafter 10 g of sodium nitrite are added, and the mixture is made up to 1 liter with water.

After drying, the goods are padded with a 5% aqueous solution of monochloroacetic acid and are steamed for 5 seconds in saturated steam of a temperature of from 105° to 110° C., then they are rinsed, soaped and dried. As a result, a bright deep green dyeing is obtained which shows good fastness properties.

What is claimed is:

1. A process for preparing a developing dyestuff on a fiber material consisting of, or containing, cellulose fibers, which comprises contacting the fiber material with an aqueous dispersion or an alkaline solution of an amine of the formula

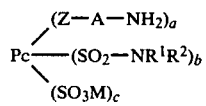

$$Pc\begin{matrix}(Z-A-NH_2)_a\\-(SO_2-NR^1R^2)_b\\(SO_3M)_c\end{matrix}$$

wherein

Pc is metal-containing or metal-free phthalocyanine,

Z is a bridge member,

A is phenylene or naphthylene which is unsubstituted or substituted by halogen, lower alkyl, lower hydroxyalkyl, lower chloroalkyl, lower alkoxy, phenoxy, carbamoyl, N-(lower alkyl)-carbamoyl, N,N-di-(lower alkyl)-carba moyl, sulfamoyl, N-(lower alkyl)-sulfamoyl, N,N-di (lower alkyl)-sulfamoyl, lower carboalkoxy, lower alkylsulfonyl, phenyl sulfonyl, trifluoromethyl, nitro, lower alkanoylamino, benzoylamino, sulfo, carboxy, cyano or a group of the formula $$R^3-SO_2-NR^4-$$

in which $R^3$ is lower alkyl, phenyl or tolyl and $R^4$ is hydrogen or lower alkyl, with the proviso that the diazotizable amino group must not be linked in ortho-position to a carboxylic or sulfonic amide group containing at least one hydrogen atom on the amide nitrogen, $R^1$ and $R^2$, which are the same or different, are hydrogen, lower alkyl, lower hydroxyalkyl, (lower alkoxy)-lower alkyl, phenyl or naphthyl, which aromatic groups are unsubstituted or substituted by methyl, methoxy, carboxy, or lower alkylsulfonyl, or $R^1$ and $R^2$ together with the nitrogen to which they are linked are piperidyl or morpholyl, M is a cation, a is a number of from 1 to 4, and b and c are numbers of from zero to 3, with the proviso that the sum of a and b and c is at most 4, and diazotizing the amine on the fiber material and coupling the diazotized amine with an azoic coupling component capable of producing a developing dyestuff.

2. A process as claimed in claim 1, wherein Z stands for a group of the formula $$-SO_2-NR^4-B-$$

wherein $R^4$ is defined as in claim 1 and B is a direct bond or a bridge member of the formula $$-(CH_2)_d-,$$

-continued

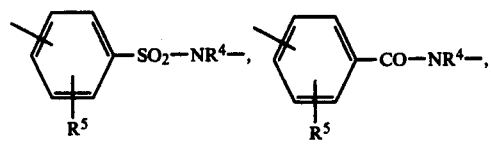

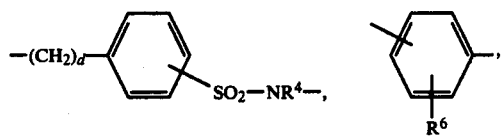

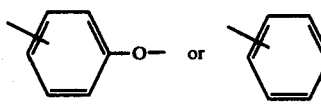

wherein d is 1 to 5,

R⁵ is lower alkyl, lower alkoxy or halogen, and

R⁶ is methyl, methoxy or chlorine.

3. A process as claimed in claim 1, wherein M is hydrogen, alkali, alkali metal or ammonium.

4. A process as claimed in claim 1, wherein Pc is metal-containing phthalocyanine.

5. A process as claimed in claim 4, wherein Pc is copper- or nickel-phthalocyanine.

6. A process as claimed in claim 1, wherein the amine has the formula

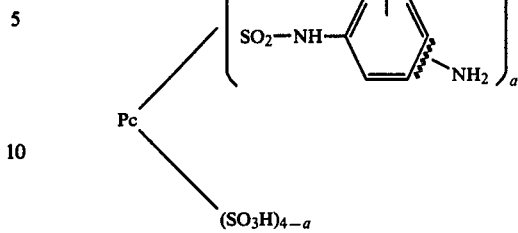

wherein Pc is nickel-phthalocyanine, $R^7$ is hydrogen, chlorine or methyl and a is 1.5 to 2.9.

7. A process as claimed in claim 6, wherein $R^7$ is hydrogen, the amino group is in the meta-position and a is 2.

8. A process as claimed in claim 6, wherein $R^7$ is parachloro, the amino group is in the meta-position and a is 2.9.

9. A process as claimed in claim 6, wherein $R^7$ is 2-methyl, the amino group is in 5-position and a is 2.5.

10. A process as claimed in claim 6, wherein $R^7$ is orthomethyl, the amino group is in para-position and a is 1.5.

11. A process as claimed in claim 6, wherein $R^7$ is hydrogen, the amino group is in para-position and a is 1.7.

12. A process as claimed in claim 1, wherein the azoic coupling component is an arylamide of acetoacetic acid, of 2-hydroxy-3-naphthoic acid or of a heterocyclic o-hydroxy carboxylic acid.

13. A process as claimed in claim 1, wherein the amine, the azoic coupling component and the derivative of nitrous acid necessary for diazotization are added altogether to the fibrous material.

14. A process as claimed in claim 1, wherein the dyestuff is developed by contacting the fibrous material with an acidic steam, by spraying, printing, padding or slop-padding the material with an aqueous acid solution or by coating the material with a foam layer containing an acid.

15. A process as claimed in claim 14, wherein the acid is a strong organic acid.

* * * * *